(12) United States Patent
Smith

(10) Patent No.: US 12,464,227 B2
(45) Date of Patent: Nov. 4, 2025

(54) METHOD AND APPARATUS FOR GENERATING PROVISIONING DATA FOR AN INSTALLED ELECTRONIC DEVICE

(71) Applicant: UBICQUIA, INC., Fort Lauderdale, FL (US)

(72) Inventor: Ronald Smith, Parkland, FL (US)

(*) Notice: Subject to any disclaimer, the term of this patent is extended or adjusted under 35 U.S.C. 154(b) by 125 days.

(21) Appl. No.: 18/400,919

(22) Filed: Dec. 29, 2023

(65) Prior Publication Data

US 2024/0224043 A1 Jul. 4, 2024

Related U.S. Application Data

(60) Provisional application No. 63/441,825, filed on Jan. 29, 2023, provisional application No. 63/436,576, filed on Dec. 31, 2022.

(51) Int. Cl.

| G06F 21/62 | (2013.01) |
|---|---|
| G06F 16/23 | (2019.01) |
| H04N 23/60 | (2023.01) |
| H04N 23/63 | (2023.01) |
| H04W 12/30 | (2021.01) |
| H04W 64/00 | (2009.01) |

(52) U.S. Cl.
CPC ........... H04N 23/64 (2023.01); H04N 23/632 (2023.01); H04N 23/633 (2023.01); H04W 12/35 (2021.01); H04W 64/00 (2013.01)

(58) Field of Classification Search
CPC .............................. H04W 12/35; H04W 64/00
USPC ........................................................ 726/26
See application file for complete search history.

(56) References Cited

U.S. PATENT DOCUMENTS

| 10,872,241 | B2* | 12/2020 | Krishnamoorthy | G08G 1/04 |
|---|---|---|---|---|
| 2015/0269188 | A1* | 9/2015 | Yang | G06K 7/10722 |
| | | | | 235/375 |
| 2021/0125143 | A1* | 4/2021 | Bartlett | G06Q 10/0832 |
| 2021/0142602 | A1* | 5/2021 | Bartlett | G07C 9/00309 |
| 2021/0149532 | A1* | 5/2021 | Yoon | G06F 3/0482 |
| 2021/0400767 | A1* | 12/2021 | Zubiaur | H04W 88/16 |

(Continued)

FOREIGN PATENT DOCUMENTS

| WO | WO-2018191198 A1 * | 10/2018 | | H04W 4/70 |
|---|---|---|---|---|
| WO | WO-2022103629 A1 * | 5/2022 | | H04L 9/0866 |

*Primary Examiner* — Haresh N Patel
(74) *Attorney, Agent, or Firm* — Daniel C. Crilly

(57) ABSTRACT

A server performs a method for automatically provisioning an electronic device installed at an installation location. The server receives (e.g., from a mobile application) information relating to installation of the electronic device at the installation location. The installation information includes at least one image captured at the installation location. The server determines whether location information for the electronic device was received from the electronic device after the device was installed. Responsive to determining that location information for the electronic device was not so received, the server determines whether the at least one image includes geolocation metadata. When the at least one image includes geolocation metadata, the server determines the geolocation of the electronic device based on the geolocation metadata. Responsive to determining the geolocation of the electronic device, the server generates at least some provisioning data for the device and transmits at least the generated provisioning data to the device.

20 Claims, 10 Drawing Sheets

(56) References Cited

U.S. PATENT DOCUMENTS

| | | | |
|---|---|---|---|
| 2022/0092283 A1* | 3/2022 | McLeod | G06K 7/1417 |
| 2022/0256327 A1* | 8/2022 | Jang | H04W 8/005 |
| 2022/0303768 A1* | 9/2022 | Balasubramanian | H04W 12/06 |
| 2022/0312207 A1* | 9/2022 | Bang | H04L 63/105 |
| 2022/0353135 A1* | 11/2022 | Bang | H04L 41/0836 |
| 2022/0400051 A1* | 12/2022 | Park | H04L 41/0816 |

* cited by examiner

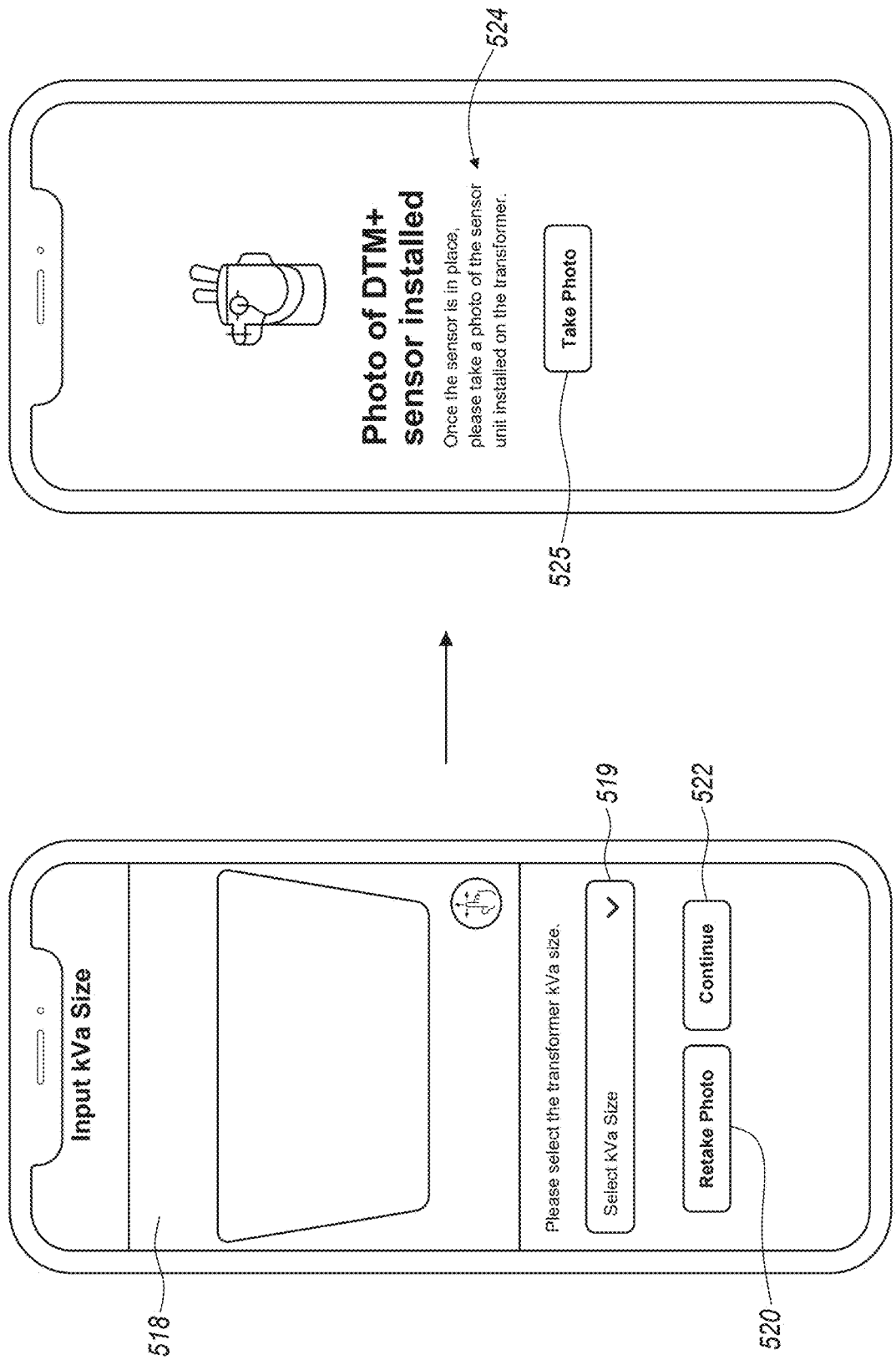

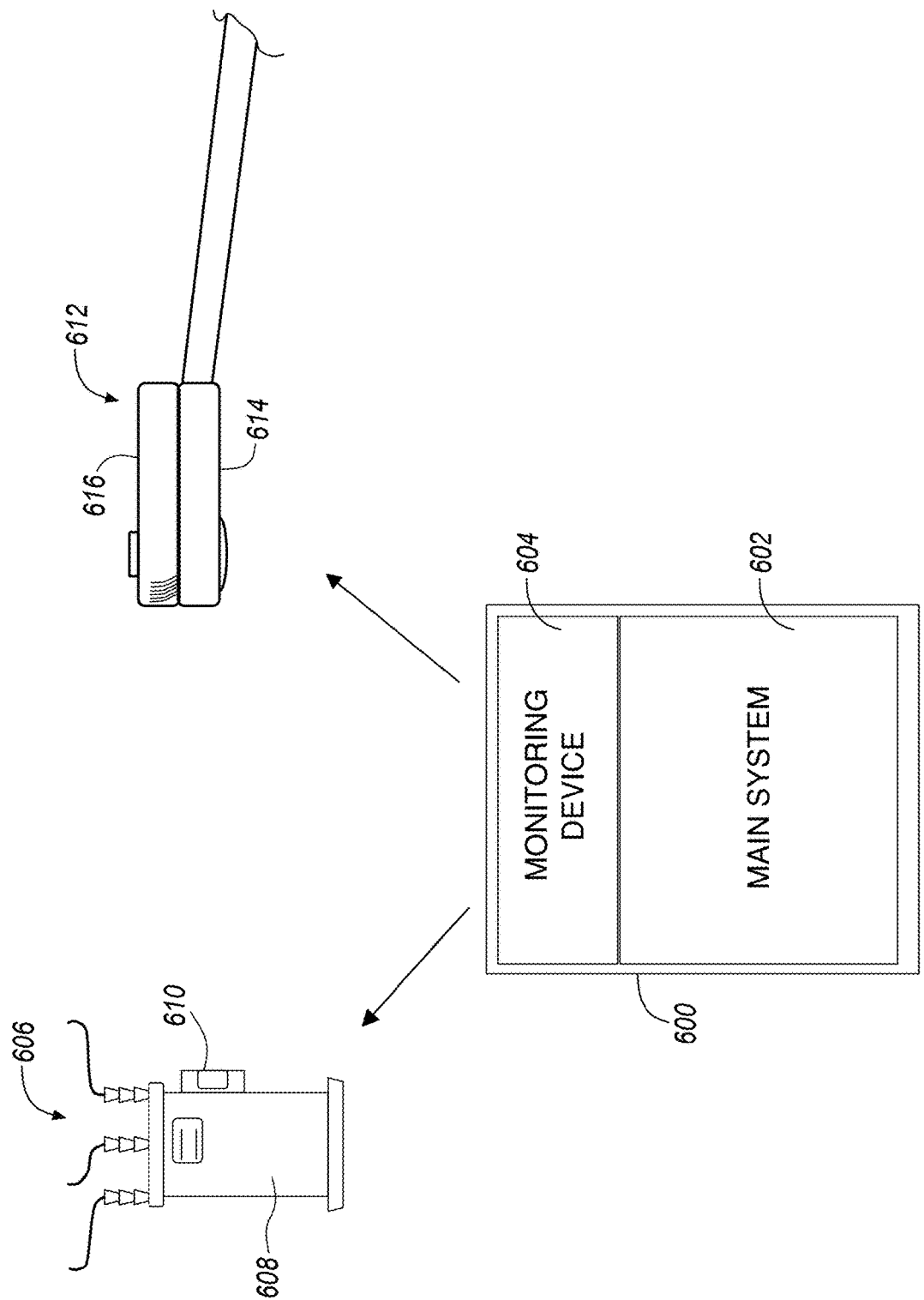

METHOD AND APPARATUS FOR GENERATING PROVISIONING DATA FOR AN INSTALLED ELECTRONIC DEVICE

CROSS-REFERENCE TO RELATED APPLICATIONS

The present application claims the benefit of and priority upon U.S. Provisional Patent Application No. 63/436,576, which was filed on Dec. 31, 2022, and is incorporated herein by this reference as if fully set forth herein. The present application further claims the benefit of and priority upon U.S. Provisional Patent Application No. 63/441,825, which was filed on Jan. 29, 2023, and is incorporated herein by this reference as if fully set forth herein.

TECHNICAL FIELD

The present disclosure relates generally to generating provisioning data for newly installed electronic devices and, more particularly, to using geolocation metadata of an image captured at or about the time of installation of the electronic device to assist provisioning data generation when the location data for electronic device is not timely received from the electronic device directly.

BACKGROUND

The world is becoming increasingly wireless and networked over wireless interfaces. The continued and expanding deployment of wireless communications infrastructure allows for wireless monitoring of infrastructure devices and equipment installed at fixed locations with sufficient wireless data network access. This has enabled activities, such as remote monitoring and data collection, which facilitates better maintenance of deployed infrastructure equipment. Further, it allows wireless provisioning of the remote monitoring and data collection equipment (e.g., Internet of Things (IoT) sensors) and delivery of subsequent updates to software and data in the remote monitoring and data collection equipment. There are many kinds of equipment and systems that can be remotely monitored using remote monitoring and data collection equipment, including, for example, electric power transformers, electrical power generation equipment (e.g., wind turbines, substations, solar farms, etc.), public safety systems and equipment, telecommunications stations, water control equipment (e.g., pumps), and many other types of infrastructure systems and equipment. By using remote monitoring and data collection equipment to monitor these infrastructure systems and equipment, greater clarity can be obtained as to the sources of failures or potential failures in the systems. Consequently, operations and maintenance costs can be reduced.

Newly installed electronic devices, such as those forming part of a monitoring system, may require provisioning to operate properly in the system. Provisioning sets up an installed electronic device in the system and configures it to perform certain tasks, such as transmitting data to a monitoring or management platform at a particular frequency or in response to certain events. Because there may be a wide variety of electronic devices, operating conditions, and tasks that can be performed, communicating provisioning information to an electronic device newly installed in a network is often necessary.

For purposes of generating provisioning information or a provisioning build for a particular electronic device, the location of the electronic device may be necessary. For example, the location of the electronic device can be used to identify other installed equipment at the electronic device's installation location with which the electronic device may be required to interact. Additionally, there may be location-specific factors that need to be taken into account when configuring or provisioning the newly installed electronic device. Further, the location of the electronic device may be needed to enable the system operator to monitor the electronic device outputs using a web-enabled or server-implemented monitoring and control platform. If installation personnel forget to provide location information or improperly do so, then delivery of the provisioning build for the electronic device may be delayed or the provisioning build may be incorrect.

SUMMARY

In accordance with some exemplary embodiments of the present disclosure, a server performs a method for automatically provisioning an electronic device installed at an installation location. The server receives information relating to installation of the electronic device at the installation location. For example, the server may receive the installation information from a mobile application running on a mobile device located at or near the installation location or elsewhere. The electronic device may be or include at least one of a monitoring device, a sensor device, a small cell access device, a wireless access point, an edge processing device or system, and an IoT device. By way of example but not limitation, the electronic device may be a monitoring device for a distribution transformer or a monitoring and control device for a streetlight.

The installation information includes at least one image captured at the installation location. The at least one image may include identification information for the electronic device and/or identification information for a piece of equipment or a device to which the electronic device is attached (e.g., an image of an asset tag, label, or other indicia of the electronic device and/or an image of an asset tag, label, or other indicia of the piece of equipment or the device to which the electronic device is attached). The at least one image may further include an image of the electronic device as mounted to the piece of equipment or the device to which the electronic device is attached, such as where the electronic device is a monitoring device or a sensor device for the piece of equipment or the device being monitored.

The server determines whether geolocation information for the electronic device (e.g., information identifying the installation location) was received from the electronic device after the electronic device was installed at the installation location (e.g., within an expected period of time, such as several minutes to several hours, after the installation). Responsive to determining that geolocation information for the electronic device was not received from the electronic device within an expected period of time, the server determines whether the at least one image includes geolocation metadata. When the at least one image includes geolocation metadata, the server determines a geolocation of the electronic device based on the geolocation metadata.

Responsive to determining the geolocation of the electronic device, the server generates at least some provisioning data for the electronic device (e.g., data reliant upon knowledge of the electronic device's geolocation) and transmits at least the generated provisioning data (e.g., a provisioning build) to the electronic device. Where the server commenced generation of the provisioning data before determining the geolocation of the electronic device (e.g., due to receipt of the electronic device's identification information from the mobile application or otherwise, or having been informed that the electronic device was scheduled for installation), the server completes generation of the provisioning data upon determining the geolocation of the electronic device and transmits all the provisioning data (e.g., the complete provisioning build) to the electronic device (e.g., via an over-the-air (OTA) deployment or otherwise, such as via Ethernet or fiber). On the other hand, where the server commenced generation of the provisioning data only after determining the geolocation of the electronic device, the server generates the provisioning data in its entirety and transmits the provisioning data to the electronic device (e.g., via an OTA deployment or otherwise, such as via Ethernet or fiber). Where the geolocation information for the electronic device was received from the electronic device within the expected period of time, the server determines the geolocation of the electronic device from the received location information (e.g., latitude and longitude coordinates of the installation location as determined by a global positioning system (GPS) receiver or other global navigation satellite system (GNSS) receiver of the electronic device).

In accordance with other exemplary embodiments of the present disclosure, a server performs a method for automatically provisioning an electronic device installed at an installation location. The server receives information relating to installation of the electronic device at the installation location. For example, the server may receive the installation information from a mobile application running on a mobile device located at or near the installation location or elsewhere. The electronic device may be or include at least one of a monitoring device, a sensor device, a small cell access device, a wireless access point, an edge processing device or system, and an Internet of Things device.

The installation information includes at least one image captured at the installation location. The at least one image may include identification information for the electronic device and/or identification information for a piece of equipment or a device to which the electronic device is attached (e.g., an image of an asset tag, label, or other indicia of the electronic device and/or an image of an asset tag, label, or other indicia of the piece of equipment or the device to which the electronic device is attached). The at least one image may further include an image of the electronic device as mounted to the piece of equipment or the device to which the electronic device is attached, such as where the electronic device is a monitoring device or a sensor device for the piece of equipment or the device being monitored.

The server determines whether geolocation information for the electronic device (e.g., information identifying the installation location) was received from the electronic device after the electronic device was installed at the installation location (e.g., within an expected period of time, such as several minutes to several hours, after the installation). Responsive to determining that geolocation information for the electronic device was received from the electronic device within an expected period of time, the server determines a geolocation of the electronic device based on the received geolocation information (e.g., latitude and longitude coordinates of the installation location as determined by a GPS receiver or other GNSS receiver of the electronic device).

Responsive to determining that geolocation information for the electronic device was not received from the electronic device within the expected period of time, the server determines whether the at least one image includes geolocation metadata. When the at least one image includes geolocation metadata, the server determines the geolocation of the electronic device based on the geolocation metadata.

Responsive to determining the geolocation of the electronic device, the server generates at least some provisioning data for the electronic device (e.g., data reliant upon knowledge of the electronic device's geolocation) and transmits at least the generated provisioning data (e.g., a provisioning build) to the electronic device. Where the server commenced generation of the provisioning data before determining the geolocation of the electronic device (e.g., due to receipt of the electronic device's identification information from the mobile application or otherwise, or having been informed that the electronic device was scheduled for installation), the server completes generation of the provisioning data upon determining the geolocation of the electronic device and transmits all the provisioning data (e.g., the complete provisioning build) or the remainder of the provisioning data to the electronic device (e.g., via an OTA deployment or otherwise, such as via Ethernet or fiber). On the other hand, where the server commenced generation of the provisioning data only after determining the geolocation of the electronic device, the server generates the provisioning data in its entirety and transmits the provisioning data to the electronic device (e.g., via an OTA deployment or otherwise, such as via Ethernet or fiber).

In accordance with additional exemplary embodiments of the present disclosure, a server for provisioning an electronic device installed at an installation location remote from a location of the server includes memory and at least one processor. The server may be a standalone server, an instance of a cloud server, or any other individual or shared server resource. The memory stores at least processor-readable operating instructions and may store other data, such as image data received from the electronic device and provisioning data for the electronic device.

The at least one processor is operable in accordance with the processor-readable operating instructions to, inter alia, receive installation information relating to installation of the electronic device at the installation location. The installation information includes at least one image captured at the installation location. The processor may be also operable in accordance with the processor-readable operating instructions to determine whether geolocation information for the electronic device was received from the electronic device after the electronic device was installed at the installation location. If such geolocation information for the electronic device was not received from the electronic device (e.g., within an expected period of time after the installation, which may be several minutes or hours), the processor may be further operable in accordance with the processor-readable operating instructions to determine whether the at least one image includes geolocation metadata responsive to determining that the geolocation information was not so received (e.g., was not timely received). When the at least one image includes geolocation metadata, processor may be further operable in accordance with the processor-readable operating instructions to determine a geolocation of the electronic device based on the geolocation metadata. Responsive to determining the geolocation of the electronic device, the processor may be further operable in accordance with the processor-readable operating instructions to generate at least some provisioning data for the electronic device (e.g., data reliant upon knowledge of the electronic device's geolocation) and transmit at least the generated provisioning data to the electronic device.

Where the server commenced generation of the provisioning data before determining the geolocation of the electronic device (e.g., due to receipt of the electronic device's identification information from the mobile application or otherwise, or having been informed that the electronic device was scheduled for installation), the server completes generation of the provisioning data upon determining the geolocation of the electronic device and transmits all the provisioning data (e.g., the complete provisioning build) or the remainder of the provisioning data to the electronic device (e.g., via an OTA deployment or otherwise, such as via Ethernet or fiber). On the other hand, where the server commenced generation of the provisioning data only after determining the geolocation of the electronic device, the server generates the provisioning data in its entirety and transmits the provisioning data to the electronic device (e.g., via an OTA deployment or otherwise, such as via Ethernet or fiber). Where the geolocation information for the electronic device was received from the electronic device within the expected period of time, the server determines the geolocation of the electronic device from the received location information (e.g., latitude and longitude coordinates of the installation location as determined by a GPS receiver or other GNSS receiver of the electronic device).

Although the present disclosure illustrates and describes a method and server for generating provisioning data for a newly installed electronic device, it is, nevertheless, not intended to be limited to the details shown because various modifications and structural changes may be made therein without departing from the spirit of the disclosure and while remaining within the scope and range of equivalents of the claims. Additionally, well-known elements of disclosed devices, systems, or servers will not be described in detail or will be omitted so as not to obscure the relevant details of the disclosure.

Features that are considered characteristic of the invention are set forth in the appended claims. Detailed embodiments of the disclosed apparatus and method are set forth herein; however, it is to be understood that the disclosed embodiments are merely exemplary. Therefore, specific structural and functional details disclosed herein are not to be interpreted as limiting, but merely as a basis for the claims and as a representative basis for teaching one of ordinary skill in the art to variously employ the claimed invention in appropriately detailed structures. Further, the terms and phrases used herein are not intended to be limiting; but rather are intended to provide an understandable description of the disclosure. While the specification concludes with claims defining the features of the invention, it is believed that the claimed invention will be better understood from a consideration of the following description in conjunction with the drawing figures, in which like reference numerals indicate like elements. The figures of the drawings are not drawn to scale.

The terminology used herein is for the purpose of describing particular embodiments only and is not intended to be limiting. The terms "a" or "an," as used herein and in the appended claims, are defined as one or more. The term "plurality," as used herein and in the appended claims, is defined as two or more. The term "another," as used herein, is defined as at least one more. The terms "including," "containing," and/or "having," as used herein and in the appended claims, are defined as comprising (i.e., open language). The term "coupled," as used herein and in the appended claims, is defined as connected, although not necessarily directly, and not necessarily mechanically. The term "providing," as used herein and in the appended claims, means bringing/coming into physical existence, making available, and/or supplying to someone or something, in whole or in multiple parts at once or over a period of time. As used herein and in the appended claims, "a display of the mobile device" means a display integrated as part of the mobile device or an external display on which the mobile device may present images, text, graphics, and other information and, where the display is a touchscreen display, from which the mobile device may receive commands, requests, or user inputs. Additionally, as used herein and in the appended claims, "a memory of the mobile device" means a solid state, removable, or other memory integrated as part of the mobile device or an external memory to which the mobile device may save and retrieve image files and other data. Further, as used herein and in the appended claims, "a camera of a mobile device" means a camera integrated as part of the mobile device or an external camera in communication with and controllable by the mobile device.

As used in this description, unless otherwise specified, azimuth or positional relationships indicated by terms such as "up," "down," "left," "right," "inside," "outside," "front," "back," "rear," "top," "bottom," "head," "tail," and so on, are azimuth or positional relationships based on the drawings, which are only to facilitate description of the embodiments of the present disclosure and simplify the description, but not to indicate or imply that the devices or components must have a specific azimuth, or be constructed or operated in the specific azimuth, which thus should not be understood as a limitation to the embodiments of the present disclosure. Furthermore, terms such as "first," "second," "third," and so on are only used for descriptive purposes and should not be construed as indicating or implying relative importance.

As used in this description and the appended claims, unless otherwise clearly defined and limited, terms such as "installed," "coupled," and "connected," should be broadly interpreted so as to mean, for example, fixedly connected, detachably connected, integrally connected, mechanically connected, electrically connected, directly connected, or indirectly connected. As used herein and in the appended claims, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this description and the appended claims, the term "longitudinal" should be understood to mean in a direction corresponding to an elongated direction of a device, element, or component. Those skilled in the art will understand the specific meanings of the above-mentioned terms in the context of the disclosed exemplary embodiments of the present disclosure.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present disclosure.

FIGS. 5A-5H illustrate various examples of a mobile device graphical user interface as presented to a user during execution of a mobile application for capturing images under conditions in which the mobile device user has limited dexterity, in accordance with some embodiments of the present disclosure.

FIG. 6 illustrates examples of installed electronic devices in need of provisioning in a monitoring system, in accordance with some embodiments of the present disclosure.

DETAILED DESCRIPTION

Figure 1:
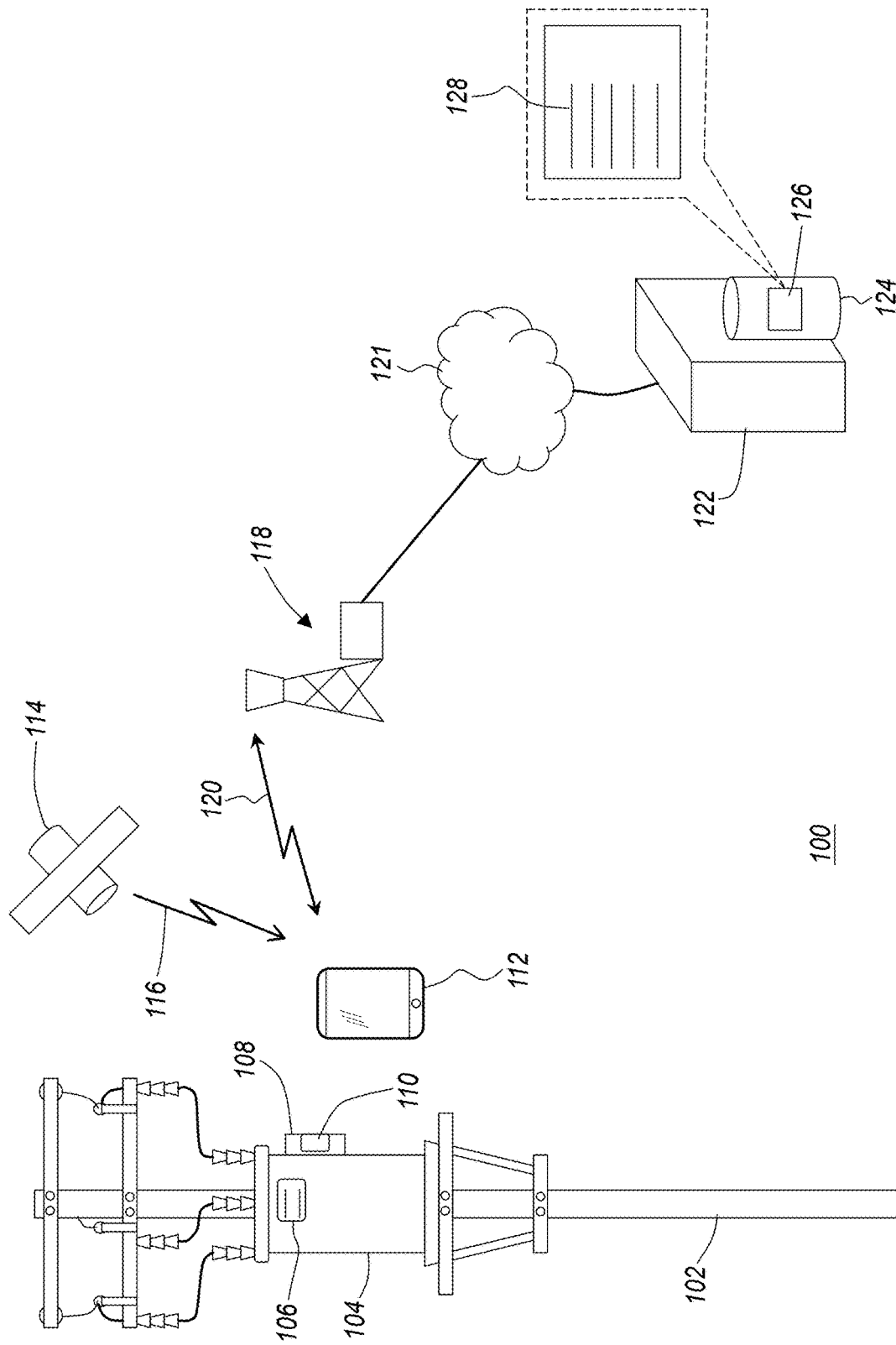
FIG. 1 illustrates a system diagram of an exemplary system in which an electronic device is installed and subsequently provisioned for operation in the system using one or more images captured by a mobile device operated at the electronic device installation location, in accordance with some embodiments of the present disclosure.

FIG. 1 illustrates a system diagram of an exemplary system 100 in which an electronic device 108 is installed and subsequently provisioned for operation in the system 100 using information provided by a mobile device 112 operated at the electronic device installation location, including one or more images captured by the mobile device 112, in accordance with some embodiments. According to this exemplary embodiment, the electronic device 108 may be a monitoring device, a sensor, or another IoT device installed at a respective location and provisioned with information based on the installation location. In other embodiments, the electronic device may be or include, for example, at least one of a monitoring device, a sensor device, a small cell access device, a wireless access point, an edge processing device or system, and an IoT device. The provisioning information can include, for example, control or configuration parameters for the electronic device 108, control or configuration parameters for other electronic devices that the electronic device 108 may supervise, monitor or control, system or monitoring device owner or operator information, driver software to interface with locally controlled equipment, and/or other data, software/firmware, and information.

In the exemplary system 100 of FIG. 1, a power distribution transformer 104 is aerially mounted on a utility pole 102. The transformer 104 transforms electric power from a transmission voltage level (e.g., tens of kilovolts AC) to a commercial or retail standard level (e.g., 120 VAC, 240 VAC, or 480 VAC). The transformer 104 may have attached thereto an information label or plate 106 that indicates a manufacturer, a serial number, a size or capacity, and various other parameters. During the life of the transformer 104, it may be desirable to monitor various transformer parameters, including, for example, oil level, oil temperature, tank temperature, tank pressure, ambient temperature, primary and secondary winding temperatures, secondary winding voltage, primary and secondary winding current, tilt, vibration, and surge arrester condition. Knowledge of these parameters can assist a utility with maintenance, replacement, and repair of the transformer or its associated or attached components. In the past, such information had to be collected manually at the transformer, if it was collected at all. Manual information collection required sending skilled lineman to the transformer 104 with a bucket truck to access the transformer 104, which added substantially to the expense of operating a power distribution network.

To mitigate the expense of manual involvement while providing consistent and regular monitoring of the transformer 104 (or any other piece of equipment, such as a utility grid asset or other remotely installed electrical, electronic, electromechanical, or mechanical device), an electronic device 108 may be attached to or proximate the transformer 104 or other monitored device or equipment. The electronic device 108 is coupled to various sensors in the transformer 104 or other monitored device and is wirelessly networked so that the electronic device 108 can continually, periodically, regularly, or as requested (e.g., polled) transmit operating parameter data to a centralized facility, such as a server 122 or data center, from or through which an operator of the system 100 can monitor system operations and be notified of any irregular events. The server 122 may be maintained by the system operator or may be a cloud-based service offered by a service provider, such as the supplier of the electronic device 108 or otherwise. Various thresholds may be set for operating parameters of a monitored device, such as the distribution transformer 104, which can be used to generate alerts to allow a system operator to decide what actions to take.

The electronic device 108 may have an asset label, plate, or tag 110 with identifying information such as, for example, a manufacturer name, serial number, build date, and other information. The information may be provided in alphanumeric form that is readable by humans, in a machine readable format, such as a bar code or an optical code (e.g., a QR code), or in both formats.

Where the electronic device 108 attaches to a piece of equipment or other monitored device, the electronic device 108 can be installed or attached at the time of manufacture of the monitored device or as a retrofit device. When installed as a retrofit device, the electronic device 108 may be installed to add the electronic device 108 to a previously installed device to be monitored (e.g., such as a previously installed distribution transformer 104) or to replace an electronic device previously installed on a device to be monitored. In other embodiments, the electronic device 108 can be installed on the device to be monitored (e.g., a transformer 104) at the same time the device to be monitored is installed.

The electronic device 108 may include a wireless or wired networking transceiver that transmits and receives information. After being installed, the electronic device 108 may await receipt of provisioning information before commencing operation in accordance with the provisioning information. In other embodiments, the electronic device 108 may include an active wireless transceiver, which is already provisioned and active in a wireless communication system (e.g., includes a pre-activated subscriber identity module (SIM) card). In such a case, once the electronic device 108 is powered up at installation, the electronic device 108 can begin transmitting data over a wireless link 120.

According to an exemplary embodiment, when an electronic device 108 is installed at an installation location or just prior to installation (e.g., prior to putting on heavy or bulky gloves or using any other item(s) that may limit dexterity), the installer may open or otherwise initiate an installation application on a mobile device 112, such as a cellular phone device (e.g., a smartphone), a cellular-capable tablet computer, or any other a cellular or wireless-capable communication device, to acquire installation-related information, such as an image of the transformer asset tag 106, an image of the electronic device asset tag 110, and/or an image of the installed electronic device 108 or the device to be monitored (e.g., distribution transformer 104). The installation application may be part of the mobile device's operating system or may have been previously downloaded to the mobile device from a server, such as a web-based application server. Besides allowing the installer to capture images with the mobile device camera or a mobile device-connected camera, the installation application may collect other information as well, such as an address or other location information (including geolocation data where the mobile device 112 includes a GPS or other GNSS receiver capable of receiving ranging and navigation signals 116 from GNSS satellites 114). The images and other information (including electronic device location information) constitute installation information, which is subsequently transmitted by the mobile device 112 through operation of the installation application to a remote server 122 (which may be cloud-hosted) for storage of the information in a memory 124, which may include a database. Where the mobile device 112 includes a cellular transceiver, the installation information is transmitted from the mobile device 112 to a cellular or other wireless network base station 118 over a wireless link 120. The information may then be sent over a wide area network 121, such as the Internet, to the server 122, which may be or include a provisioning server.

Once the information arrives at the server 122, it is stored in a record 126 of the memory 124 and cross-referenced with other information. The record 126 may include various information and data 128, some of which is fixed and some of which can vary (e.g., operating parameter histories). The installation information may also be used by application programs of the provisioning server (e.g., server 122) to generate provisioning information to be sent to the electronic device 108 so that the electronic device 108 can commence reporting to the server 122 in accordance with operation of the electronic device's operating system. The provisioning information may include instructions and configuration parameters to, inter alia, instruct the electronic device 108 how often to report data and set thresholds for various monitored parameters to prompt the electronic device 108 to report event(s) based on the values of the monitored parameters as compared to their respective thresholds. Thus, monitored data may be regularly reported to record a history of the operation of the monitored device (e.g., the transformer 104) and data indicating that an operating parameter (or a combination of operating parameters) of the monitored device exceeds or does not meet a threshold can be reported with a flag or code that causes the server 122 to alert personnel or otherwise draw attention to the event.

In some embodiments, the server 122 is or includes a provisioning server that generates provisioning information for newly installed electronic devices 108. In other embodiments, the provisioning server may be a separate server accessible through a secure gateway. The server 122 may also or alternatively include one or more processers operable according to processor-readable operating instructions, such as software, stored in the memory 124 to perform various tasks, processes, and steps for interacting and communicating with the mobile device 112 and the electronic devices 108 consistent with the description herein.

When capturing images using the mobile device 112 (e.g., using a camera of the mobile device 112), the mobile device 112 may geotag the captured images in accordance with known techniques. Geotagging involves providing geolocation information in metadata associated with a captured image. The mobile device 112 may include a satellite location receiver that receives location signals 116 from location satellites 114 that are in a low orbit around the Earth. A commonly used satellite location system is GNSS or, more particularly in the United States, GPS. Accordingly, the mobile device 112 may include a GNSS or GPS receiver. The geolocation data of the mobile device 112 may be sent as metadata with each of the images captured by a camera of the mobile device 112 and communicated from the mobile device 112 to the server 122 as part of execution of an installation application on the mobile device 112 at or about the time the electronic device 108 is installed.

Figure 2:
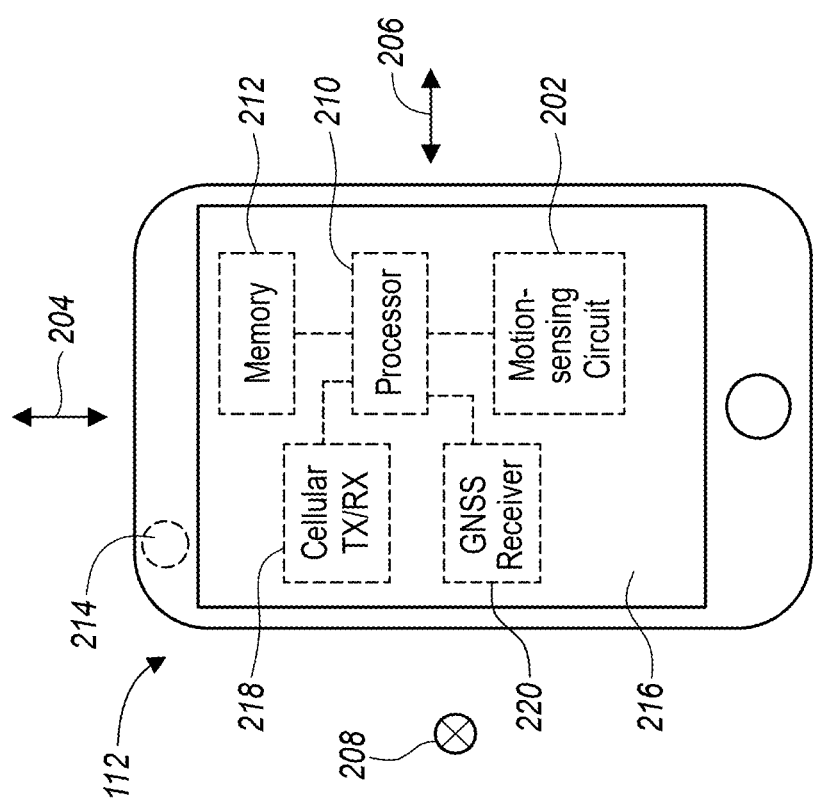
FIG. 2 illustrates an exemplary mobile device having a motion-sensing circuit capable of detecting when the mobile device is moved back and forth (e.g., accelerated and decelerated), in accordance with some embodiments of the present disclosure.

FIG. 2 illustrates an exemplary mobile device 112 that includes, inter alia, a motion-sensing circuit 202, at least one processor 210 (one shown), memory 212, at least one camera 214 (e.g., a forward-facing camera and/or a rearward-facing camera), a display 216, a wireless transceiver 218 (e.g., cellular transceiver (TX/RX)), and a GNSS receiver 220. The motion-sensing circuit 202 is capable of detecting when the mobile device 112 is moved repeatedly (e.g., accelerated and decelerated or shaken), in accordance with some embodiments of the present disclosure. The motion-sensing circuit 202 may include a multi-dimension accelerometer or multiple single dimension accelerometers that are capable of detecting and quantifying acceleration in several directions, as well as determining the direction of gravity, relative to the mobile device 112. For example, the motion-sensing circuit 202 may detect vertical ("Y" direction) acceleration 204, horizontal ("X" direction) acceleration 206, and/or "Z" direction acceleration 208 (in/out of the drawing sheet). Acceleration in each of these directions can be measured or otherwise determined based on the outputs (e.g., output voltages) of the motion-sensing circuit 202, as indicated in exemplary form in FIG. 3.

The processor 210, the memory 212, the camera 214, the display 216, the wireless transceiver 218, and the GNSS receiver 220 are conventional components of various mobile devices 112, such as smartphones and tablet computers. However, the processor 210 may acquire via the wireless transceiver 218 or otherwise a copy of the installation application, which may be stored in the memory 212. Upon initiation or activation of the installation application (e.g., at or prior to the time of installation of the electronic device 108), the executed instructions of the installation application cause the processor 210 to perform various actions and steps as described herein.

Figure 3:
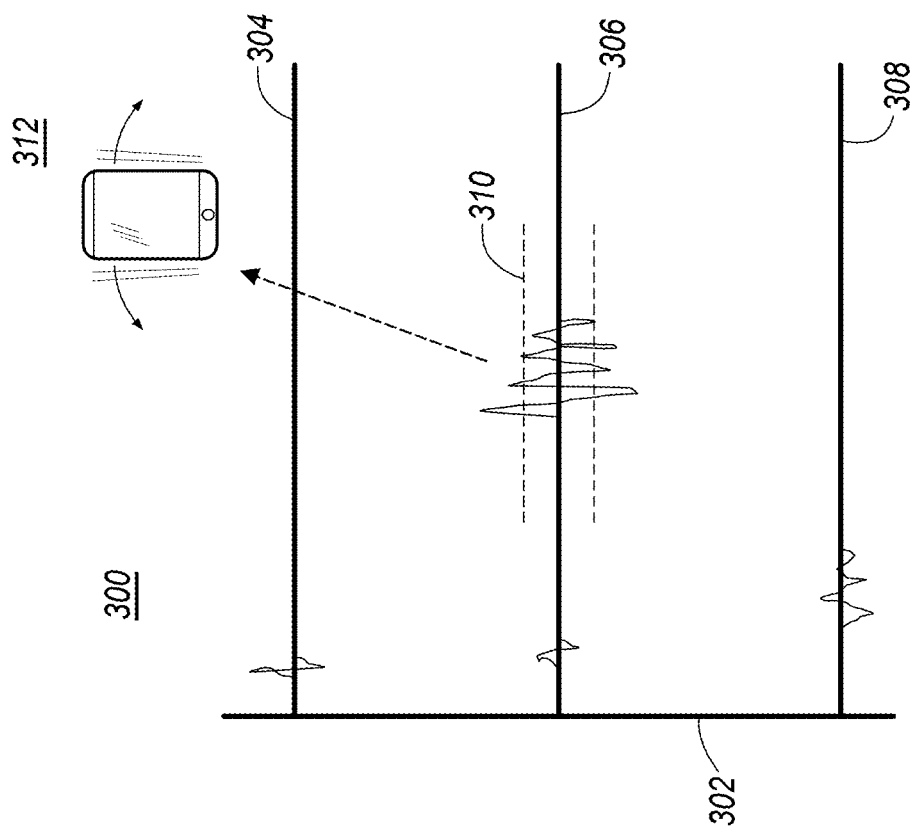
FIG. 3 illustrates exemplary outputs on a per-axis or per-direction basis from a motion-sensing circuit of a mobile device when the mobile device is moved repeatedly as part of executing a method for capturing images under conditions in which the mobile device user has limited dexterity, in accordance with some embodiments of the present disclosure.

The graph 300 shown in FIG. 3 illustrates exemplary representations of acceleration magnitudes 302 in the X-direction 304, the Y-direction 306, and the Z-direction 308 over time. Each acceleration magnitude may be compared to a respective threshold or threshold range to determine if the acceleration is consistent with the mobile device 112 being shaken or otherwise moved repeatedly during a motion detection time period (e.g., three seconds). For example, if the mobile device 112 is shaken horizontally 312 as illustrated in FIG. 3, then the magnitude 302 of the output of the motion-sensing circuit 202 (e.g., accelerometer) relating to a horizontal or Y-direction 306 may exceed a threshold 310 or threshold range used to determine whether the mobile device 112 has been moved repeatedly over the motion detection time period. According to one preferred embodiment, the detected motion event is used to trigger the installation application to commence the collection of installation information. For example, after initiating or activating the installation application on the mobile device 112, the detection of a shaking movement of the mobile device 112 may be used to control a portion of the installation information collection process, such as, for example, capturing an image relating to the installation via the camera 214. Because installation personnel may wear heavy, bulky gloves when installing an electronic device 108, such personnel may have limited dexterity during the installation and difficulty operating buttons or a touch screen interface on the mobile device 112. Therefore, according to the present disclosure, the image collection process relating to the electronic device installation may be automatically initiated by repeatedly moving (e.g., shaking) the mobile device 112 and then, upon being visually or audibly prompted by the installation application, orienting the camera 214 of mobile device 112 so as to position a desired object within a field of view of the camera 214 during a countdown time period and awaiting the automatic capture and storage of an image of the object upon expiration of the countdown time period.

Figure 4:
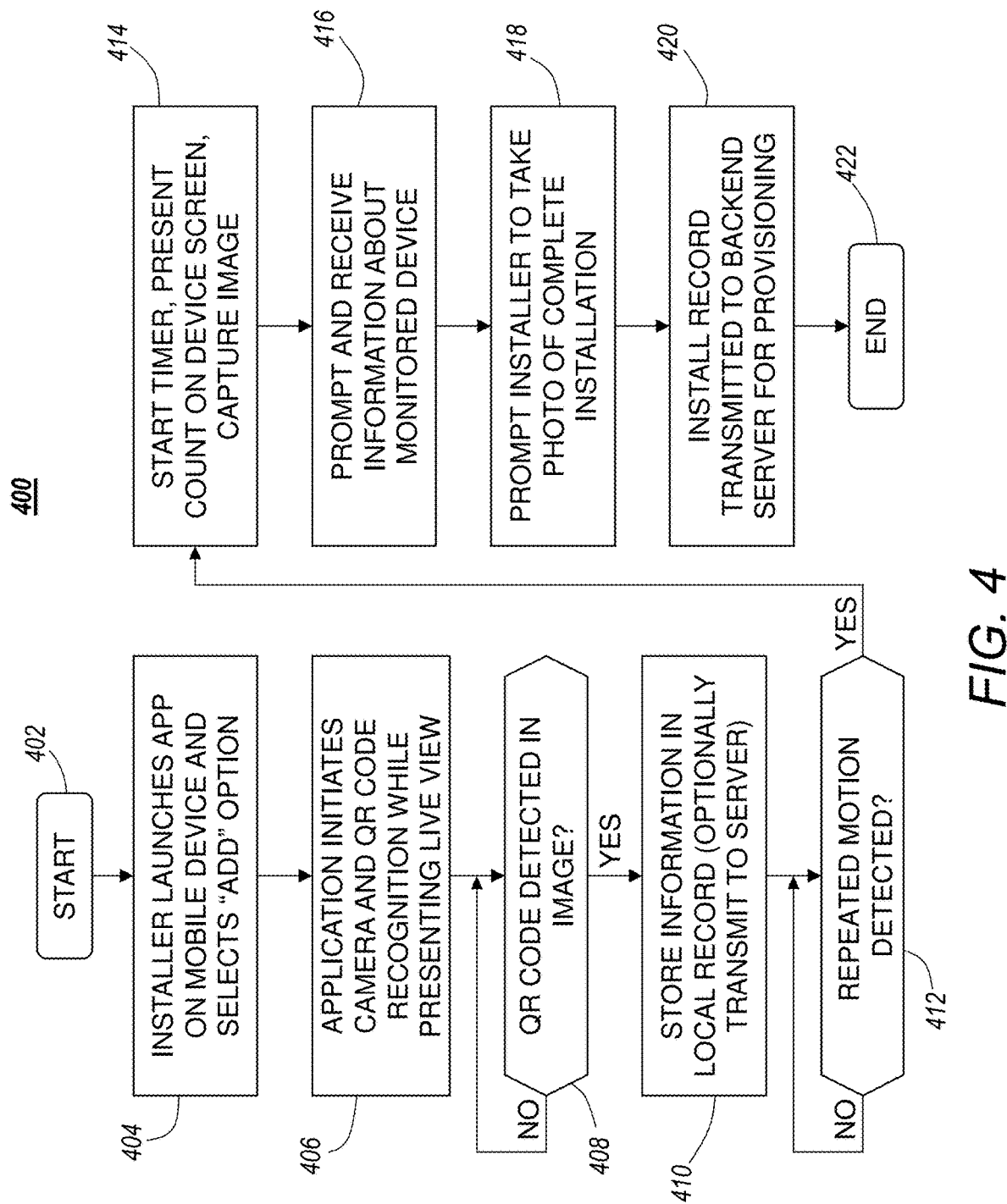
FIG. 4 illustrates a logic flow diagram of steps executed by a processor of a mobile device according to an installed mobile application to capture an image of an object under conditions in which the mobile device user has limited dexterity, in accordance with some embodiments of the present disclosure.
Figure 5B:
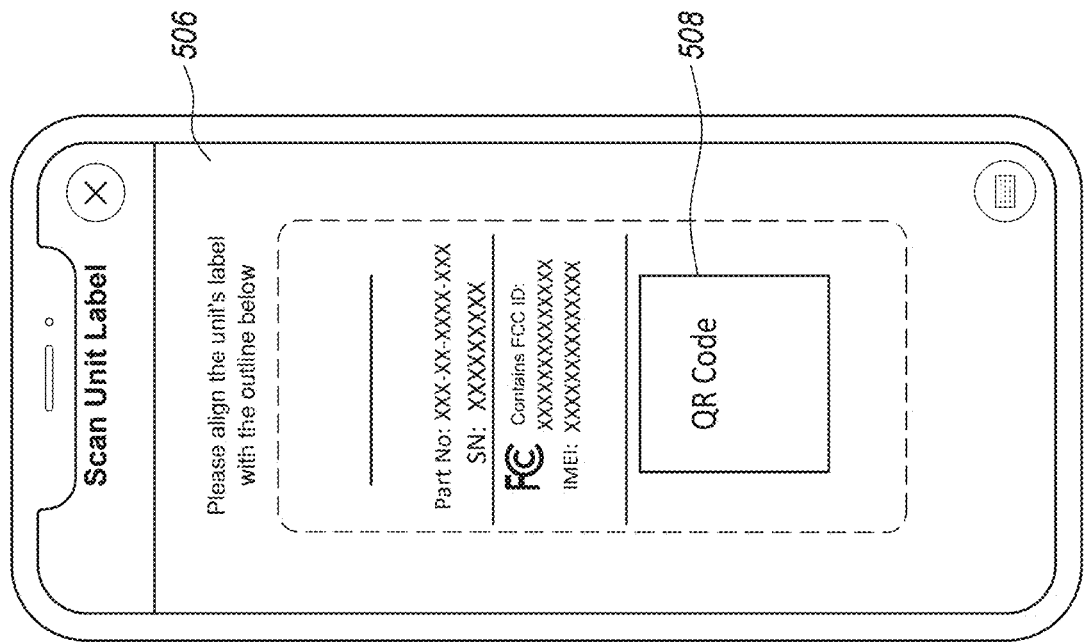
Figure 5A:
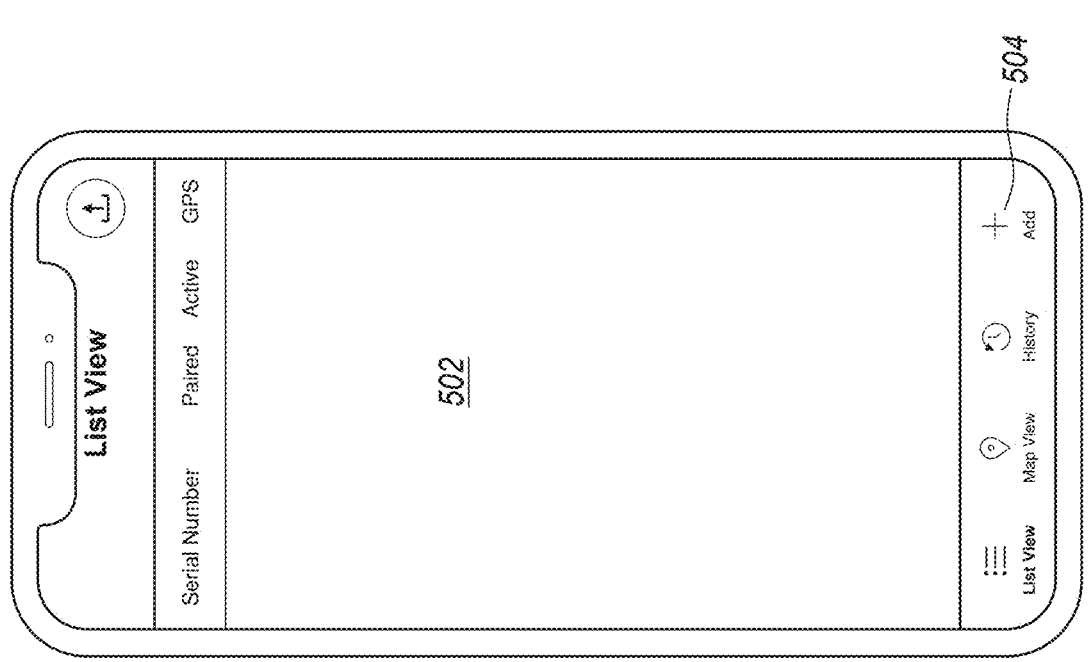

FIG. 4 is a logic flow diagram 400 of steps executed by a processor 210 of a mobile device 112 in accordance with an application installed or stored on the mobile device 112 to capture an image of an object under conditions or circumstances in which the mobile device user has limited dexterity, in accordance with some embodiments of the present disclosure. The logic flow of FIG. 4 may be better understood with contemporaneous reference to FIGS. 5A-5H. The logic flow begins (402) when the processor 210 detects that a user (e.g., an installer of an installable and remotely provisionable electronic device 108 and/or a device 104 or piece of equipment to which the electronic device 108 is or will be attached or configured to monitor) launched (404) or otherwise initiated the application. The application may be an installation application relating to the electronic device 108, which is designed to, inter alia, collect certain installation information. After the application is launched, an initial user interface screen 502 of the application may be shown on the display 216 of the mobile device 112, as shown in exemplary form in FIG. 5A. From the initial user interface screen 502, the user can select an "ADD" button 504 to add an installation record and commence a process to capture installation information for a new electronic device installation. The mobile application may be activated and the "Add" button 504 selected prior to the user becoming subject to conditions or circumstances that limit the user's dexterity (e.g., prior to putting on bulky gloves).

After receiving the user's selection of the "ADD" button, the mobile device processor 210, executing the mobile application, may activate or initiate (406) a camera of the mobile device 112 (e.g., an integrated camera 214 of the mobile device 112) and display a live view 506 from the camera 214 on the display 216 of the mobile device 112. A live view is a real-time display of the live stream of images being captured by the camera 214 on the display 216 of the mobile device 112. The mobile application may be configured to instruct the mobile device processor 210 to continuously monitor (408) a defined (e.g., boxed) area of the live view 506 for the presence of a digital code, such as a QR code 508, as may be contained or disposed on an object (such as, but not limited to, a label, plate or tag on an electronic device 108 or on a monitored device 104 at an installation location). The asset tag may include identification information for the electronic device 108, such as a serial number, a manufacturer name, and an International Mobile Equipment Identifier (IMEI) of the electronic device's wireless network transceiver 218 or a SIM card used by the mobile device's wireless network transceiver 218. Upon detecting the QR code 508, the mobile device processor 210 automatically activates the camera 214 to capture an image of the object (e.g., the asset tag) within the defined area of the live view 506 and stores (410) the image in the mobile device memory 212. The QR code 508 may include encoded information, such as a uniform resource locator (URL) of a secure website at which the asset tag information is stored, in addition to a digitized version of the device identification information shown in alphanumeric form on the asset tag. The image of the asset tag may be optionally transmitted to the server 122. If the display 216 of the mobile device 112 goes dark because the mobile device 112 enters sleep mode to conserve battery power prior to the mobile device processor 210 detecting the QR code 508, the mobile application may be awakened by moving the mobile device 112 repeatedly (e.g., shaking it) and, upon detecting the mobile device 112 has moved repeatedly within a motion detection time period (e.g., one to five seconds), the mobile application will cause the mobile device processor 210 to activate the camera 214 of the mobile device 112 and resume display of the live image stream captured by the camera 214 on the mobile device display 216.

After capturing and storing the electronic device's identification information (e.g., as contained on the device's label or asset tag) or as part of doing so, the mobile application causes the mobile device processor 210 to determine (412) whether the mobile device 112 has been repeatedly moved (e.g., shaken) within a motion detection time period. For example, according to one exemplary embodiment, the mobile application may cause the mobile device processor 210 to display instructions 510 on the display 216 of the mobile device 112 (such as, for example, the instructions shown in exemplary form in FIG. 5C) to instruct the user to shake the mobile device 112 to activate the camera 214 for capturing an image of another object, such as the asset tag or nameplate of the monitored device 104. It should be noted that a substantial period of time (e.g., several minutes) may pass between the time that the identification information for the electronic device 108 is captured by the camera 214 and commencement of a motion detection time period during which the mobile device 112 is shaken or repeatedly moved in one or more directions to capture an image of the identification information for the monitored device 104.

When the user of the mobile device 112 is ready to capture the identification information for the device 104 to be monitored by the installed electronic device 108, the mobile device user shakes the mobile device 112 and the processor 210 detects (412) such shaking. As detailed above, shaking of the mobile device 112 can be determined by the processor 210 by determining that a magnitude of one or more outputs of a motion-sensing circuit 202 exceeds one or more thresholds or remains within one or more threshold ranges over a motion detection time period (e.g., one to five seconds).

Figure 5D:
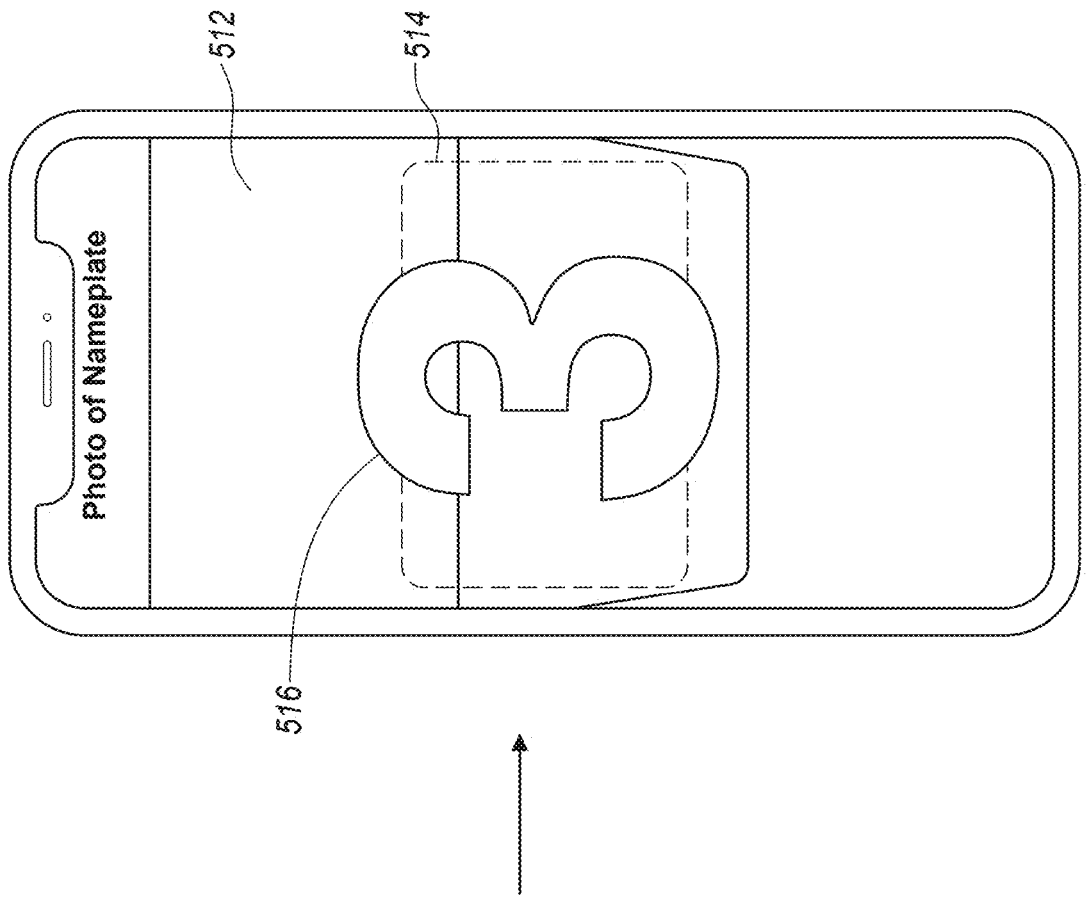
Figure 5C:
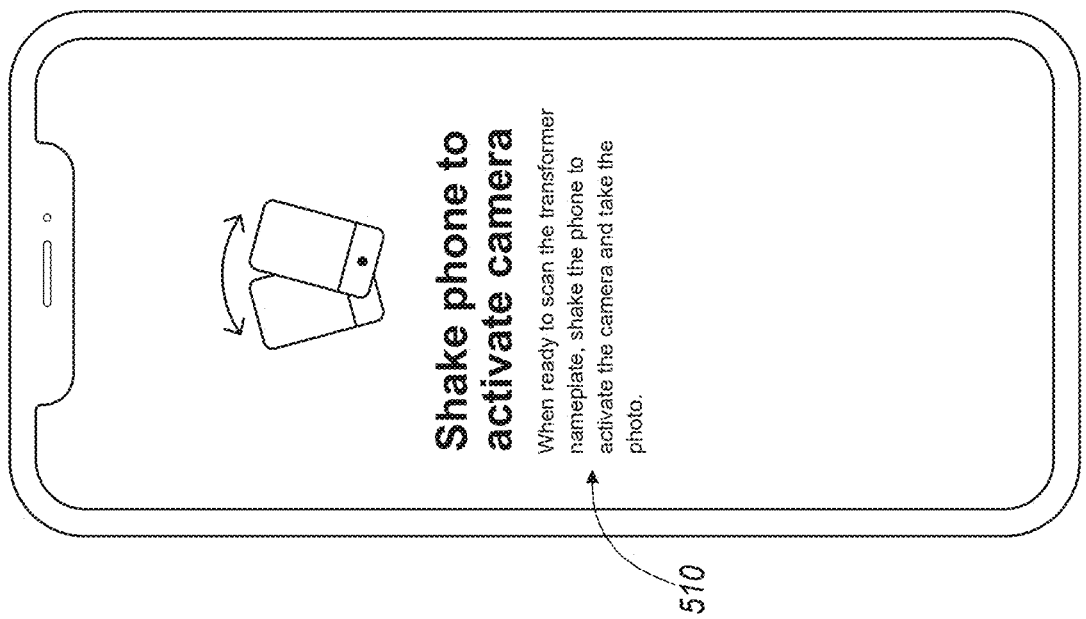

After the mobile device processor 210 determines (412) that the mobile device 112 has been shaken or otherwise moved repeatedly during execution of the mobile application, the mobile device processor 210 starts (414) a timer (e.g., a countdown timer) and may optionally present a live view 512 of the camera images and a visual of the countdown time 516 of the timer overlaying the live view 512, as shown in exemplary form in FIG. 5D. During the countdown time period (e.g., three to six seconds), the mobile device user (e.g., the electronic device installer) orients the mobile device 112 so that the asset tag or other identifying indicia of the monitored device 108 is in a defined (e.g., boxed) area 514 of the live view 512. Upon expiration of the countdown time, the mobile application causes the mobile device processor 210 to control the camera 214 of the mobile device 112 to automatically capture the image 518 contained within the defined area 514 of the live view 512 and store the captured image 518 in a memory 212 of the mobile device 112.

The mobile application may also cause the mobile device processor 210 to determine a geolocation of the mobile device 112 or the camera 214 (where the camera is not integrated with the mobile device 112) at the time the image 518 was captured by acquiring geolocation data from the mobile device's location processor (e.g., GNSS receiver 220) and adding the geolocation as a geotag into the metadata for the image file of the captured image 518. Once the image 518 for the identifying information of the monitored device 104 has been captured, the mobile application may cause the mobile device processor 210 to display the captured image 518 on the mobile device display 216 and provide (416) options for the mobile device user to enter information, retake the photo, or continue, as shown in exemplary form in FIG. 5E. For example, the mobile application may be configured to allow some information for the monitored device (e.g., such as the kVA of a monitored distribution transformer 104) to be selected from a drop-down menu 519. If the user wants to retake the photo, then the user can select a button 520 or re-shake the mobile device 112 and the process will return to step 412.

When the user determines that the captured image 518 of the monitored device's asset tag or other identifying information is acceptable, the user may select a "Continue" button 522, and the mobile application may cause the mobile device processor 210 to prompt (418) the user to take a photo of the complete installation (e.g., the combination of the electronic device 108 and the monitored device 104). An exemplary mobile device display screen 216 with instructions 524 for taking a photo of the complete installation is shown in FIG. 5F. The displayed instructions may further include a button 525 to enable the user to elect to take a photo of the complete installation. Alternatively, the instructions may direct the user to shake the mobile device 112 to activate the camera 214 to start another countdown timer for automatically taking the photo.

Figure 5H:
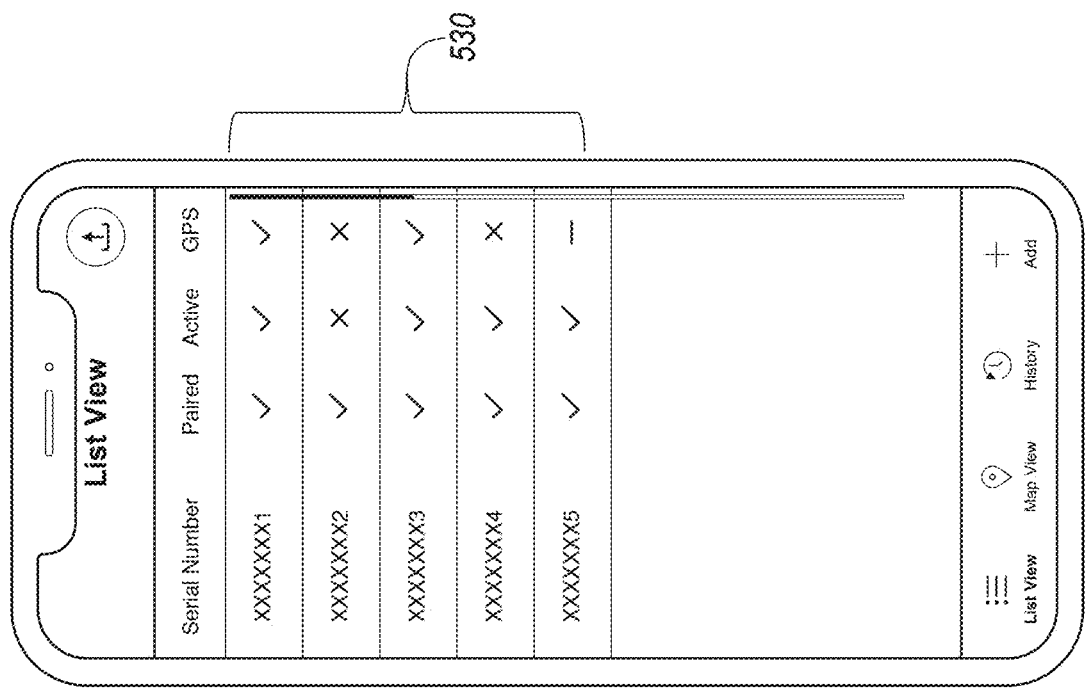
Figure 5G:
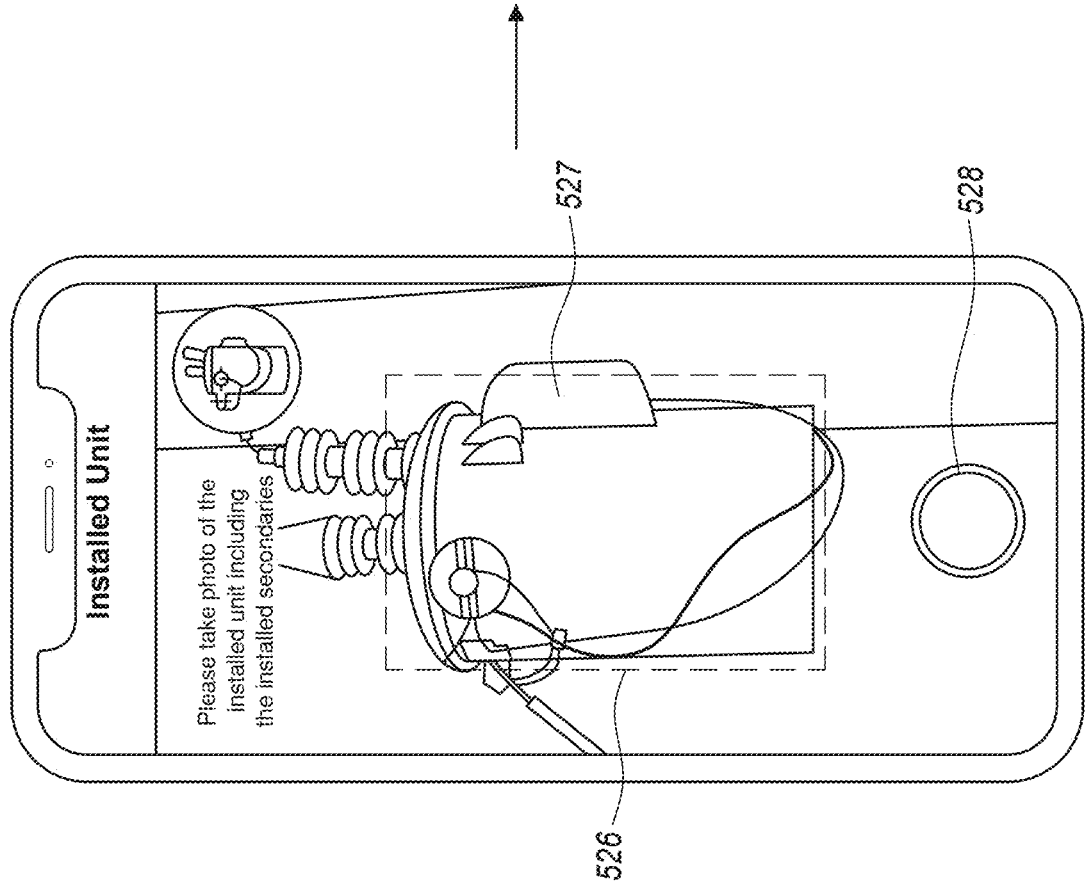

When a photo of the complete installation is to be taken, the mobile application may cause the mobile device processor 210 to display another live view from the camera 214 of the mobile device on the mobile device display 216 together with a defined (e.g., boxed) area 526 in which the complete installation should be shown. An exemplary mobile device display screen 216 for capturing an image of the complete installation is shown in FIG. 5G. With the live view showing, the user can orient the mobile device 112 to have the monitored device (e.g., transformer 104) and the electronic device 527 within the defined area 526 and then tap a displayed button 528 or await expiration of a countdown time to capture the image. After the image of the complete installation is captured, the image is stored in the memory 212 of the mobile device 112 and communicated to the server 122 for use during provisioning of the electronic device 108, 527. The mobile application may be further configured to cause the mobile device processor 210 to display various installation information on a display 216 of the mobile device 112 so the user can confirm all necessary information was captured before leaving the installation location. An exemplary mobile device display screen 216 showing a list view 530 of identifying information (e.g., serial numbers) for installed electronic devices 108, 527 and various statues of such devices 108, 527 is shown in FIG. 5H. The mobile application may further cause the mobile device processor 210 to transmit (420) the installation record for each installed electronic device 108, 527 to the server 122 for use in generating provisioning information for the electronic device 108, 527. Alternatively, the installation information for each installed electronic device 108, 527 can be transmitted to the server 122 as it is acquired by the mobile device 112. Once the installation information has been acquired and transmitted to the server 122, the process ends (422).

FIG. 6 illustrates examples of installed electronic devices 108, such as monitoring devices 604, in need of provisioning in a monitoring or management system, in accordance with some embodiments of the present disclosure. In general, but not exclusively, installed equipment 600 may include a main system 602 and an electronic device 604 that monitors the main system 602. The main system 602 is a piece of equipment or a device being monitored by a monitoring device 604. The monitoring device 604 includes sensor circuitry to produce data from various sensors used to sense or monitor various parameters of the main system 602. This sensed raw data or processed data based on the sensed raw data (e.g., where the monitoring device 604 includes an edge processor) is transmitted to the server 122 for recordation and optional analysis by a server application. Examples of installed equipment 600 include a transformer system 606 or a lighting system 612. The lighting system 612 may include a streetlight 614 that is controlled by a light controller unit 616 that also acts as a monitoring device 604 (e.g., monitoring various parameters of the streetlight, such as on/off status, power consumed, operating voltage and/or current, and other parameters). The transformer system 606 may include a distribution transformer 608 (aerial version shown for illustration but may be padmounted or underground instead) and a monitoring device 610. The transformer system 606 and the lighting system 612 are merely two examples of a wide variety of equipment 600 that can be installed and monitored. For example, in the streetlight system 612, the monitoring device 616 may monitor activities other than streetlight operation and may include cameras and other sensors. Alternatively, in the streetlight system, the monitoring device 616 may be another functional electronic device, such as a small cell access node or an edge processor.

Each monitoring device 604 is capable of wireless networked communication. The particular wireless communication protocol used by each monitoring device 604 can vary, however. For example, a cellular data connection can be used in some applications, while in other applications, a wireless local area network (e.g., Wi-Fi) or a fiber connection can be used. The particular communication protocol used by a networking device 604 may depend on the location of the installed equipment 600 and the communication resources that are available at that location. After the installation is complete, the monitoring device 604 will need to be provisioned to operate as desired. The installation information communicated to the server 122 includes information about the monitoring device 604 that allows the server 122 to communicate directly with the monitoring device 604 over the applicable wireless or wired communication link. Thereafter, the monitoring device 604 and the server 122 communicate as needed.

In other embodiments, the main system 602 may or may also be the device or apparatus in need of provisioning by the monitoring or management server 122 (e.g., where the installed equipment does not include a monitoring device 604 or where both the monitoring device 604 and the main system 602 require remote provisioning from the management server 122). For example, in the exemplary streetlight system 612 illustrated in FIG. 6, the device 616 connected atop the streetlight 614 may be a Wi-Fi access point, an edge processor with connected accessories (such as one or more cameras, motion sensors, or speakers), a smart camera or set of smart cameras, a small cell access node, or another electronic device to be managed by the management system operating on the server 122. In such a case, the main system 602 is the electronic device to be installed and provisioned in accordance with the present disclosure.

Figure 7:
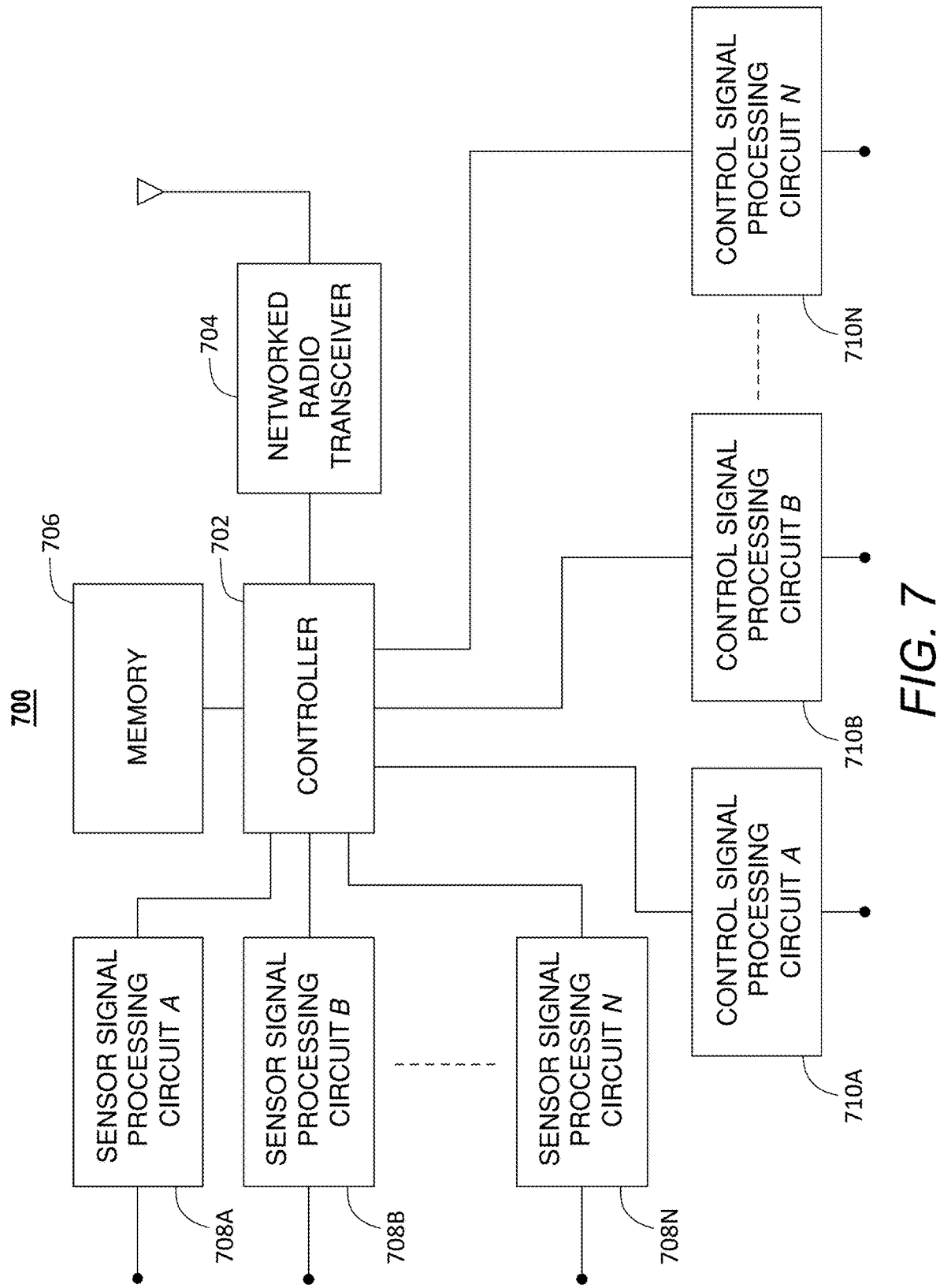
FIG. 7 illustrates a schematic block diagram of a wireless electronic device, such as a sensor or monitoring device, which is installable and remotely provisionable, in accordance with some embodiments of the present disclosure.

FIG. 7 illustrates a schematic block diagram of an exemplary wireless electronic device 700, which is installable and remotely provisionable, in accordance with some embodiments of the present disclosure. The electronic device 700 is a device that communicates with other devices and may be, for example, a monitoring device 604 that monitors a main system 602 and communicates various operating data for the main system 602 to a central or cloud-based monitoring and management platform (e.g., a server 122) or may be the main system 602 itself, where the main system 602 reports data to, receives configuration files or other software or firmware from, or is otherwise managed or controlled by the management platform executing on the server 122. Prior to fully operating in a system, the electronic device 700 must be provisioned in the system with an appropriate configuration file and other data, which instructs the electronic device 700 how to operate in the particular system to which the electronic device 700 belongs.

The exemplary electronic device 700 includes, inter alia, a controller 702, one or more networked radio transceivers 704 (one shown for illustration purposes), and memory 706, and may also include one or more sensor signal processing circuits 708A-708N (three shown for illustration purposes) and one or more control signal processing circuits 710A-710N (three shown for illustration purposes). The controller 702 includes one or more processors capable of executing instruction code (e.g., firmware and/or software), as well as filtering and other conventional circuit components. The controller 702 is coupled to the memory 706, which may include random access memory (RAM), read only memory (ROM), cache, flash memory, volatile memory, nonvolatile memory, and so forth. Instruction code (operating instructions) for the controller 702 can be stored in the memory 706, along with variables and other data structures. Data acquired or determined by the sensor signal processing circuits 708A-708N, when included, may also be stored in the memory 706 until it can be transmitted to the server 122 or for longer depending on the architecture of the memory 706.

Communication is facilitated by the networked radio transceiver 704, such as a wireless modem, that communicates using any known wireless networking protocol. In some embodiments, a wired connection (e.g., Ethernet or fiber) can alternatively be used in place of or in addition to the radio transceiver 704.

The controller 702 is operably coupled to the one or more sensor signal processing circuits 708A-708N, when such circuits are included. Each of the sensor signal processing circuits 708A-708N may be connected to a respective sensor used to monitor one or more parameters of a main system 602 and output signals corresponding to the monitored parameter(s). Where the signals output by a sensor are analog in nature, they may be first digitized in an analog-to-digital converter or so converted within the respective sensor signal processing circuit 708 or the controller 702. After receiving a sensor signal from a sensor signal processing circuit 708, the controller 702 may process it for transmission via the radio transceiver 704 or may further process it based on operating instructions stored in the memory 706 to, for example, compare the received sensor data to one or more thresholds, store the data in the memory 707, and so on. The provisioning information for the electronic device 700, as received from the server 122, may instruct the controller 702 how often to sample and report sensor data.

Each control signal processing circuit 710A-710N may receive instructions from the controller 702 to generate one or more control signals for controlling various subsystems of the main system 602 being monitored. For example, if the main system 602 includes a light controller for a streetlight lighting system, the controller 702 may receive an output signal from an ambient light sensor and process it. When the controller 702 determines that the sensor output signal is below a threshold corresponding to a minimum ambient light level, the controller 702 may instruct the light controller's control signal processing circuit 710 to turn on the streetlight. The minimum ambient light level may be a parameter included in the electronic device's provisioning information.

Figure 8:
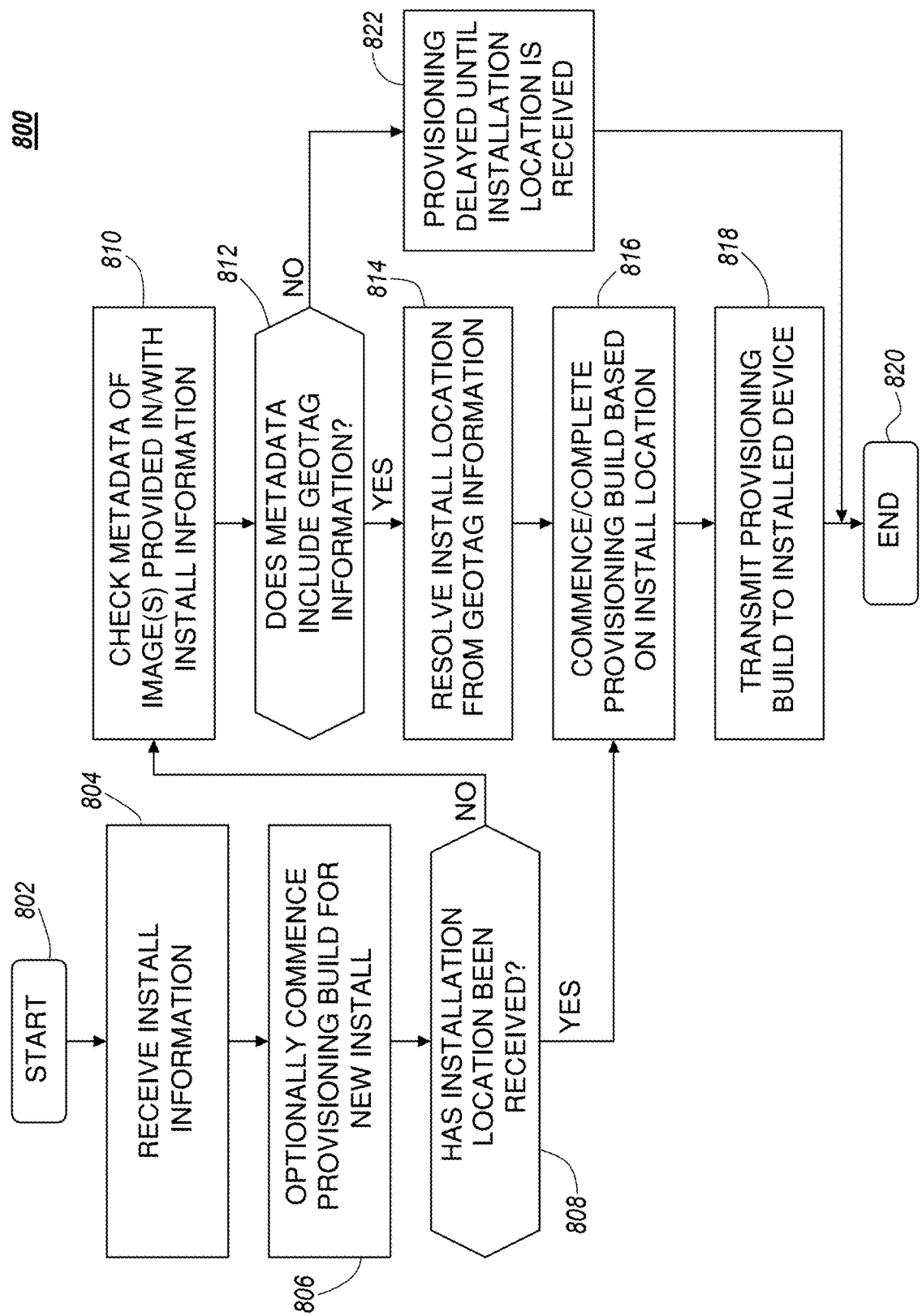
FIG. 8 illustrates a logic flow diagram of steps executed by a provisioning server to provide provisioning data to an electronic device remotely installed at an installation location remote from the server, in accordance with some embodiments of the present disclosure.

FIG. 8 illustrates a logic flow diagram 800 of steps executed by a provisioning server to provide provisioning data (e.g., a provisioning build) to an electronic device 700 remotely installed at an installation location remote from the server, in accordance with some embodiments of the present disclosure. The provisioning server may be or form part of a server 122 executing a monitoring and/or management platform for remotely installed electronic devices 700. Thus, the steps illustrated in the logic diagram 800 of FIG. 8 may be implemented in software executable by one or more processors of the provisioning server. According to the logic flow, location information for the newly installed electronic device 700 may be used, where necessary, to associate the electronic device 700 with a main system 602 being monitored and/or the owner or operator of the equipment 600 that includes the electronic device 700 and the main system 602. In addition, location information for the electronic device 700 may be used to select operating parameters for the electronic device's provisioning build. Further, location information for the electronic device 700 may be used in a management and control system to enable the owner or operator of the equipment 600 to view the installed base of electronic devices 700 throughout a geographical area in various formats, including a map view.

According to one exemplary embodiment, the logic flow begins (802) when the server 122 receives (804) installation information for the newly installed electronic device 700. According to one preferred embodiment, the installation information was communicated from a mobile application running on a mobile device 112 in a manner similar to the process disclosed above with respect to FIGS. 1-5G. After receiving the installation information for the electronic device 700, the server 122 may optionally commence (806) a provisioning build of provisioning data for the electronic device 700. Commencement of the provisioning build, which may include configuration data (e.g., configuration parameters) for the electronic device 700, may be performed in response to receiving the installation information from the mobile device 112 or receiving a separate request for provisioning data or information from the electronic device 700. However, completion of the provisioning build is not completed until after the server 122 has received or determined the geolocation of the electronic device 700.

After optionally commencing the provisioning build, the provisioning server determines (808) whether it has received geolocation from the installed electronic device 700 or from some other reporting source, such as an installation application running on a mobile device 112. In other words, the server 122 determines whether the electronic device 700 has self-reported its geolocation or whether the geolocation of the electronic device 700 was communicated to the server 122 in another manner. In certain circumstances, the electronic device 700 may include a GNSS receiver 220 (e.g., such as a GPS receiver) or other location-determining processor and the electronic device's radio transceiver 704 may be active on a radio or cellular network at the time of installation (e.g., where a SIM card for the cellular network on which the radio transceiver 704 operates was activated as part of the electronic device's manufacturing process). In such a case, the server 122 may expect the electronic device 700 to automatically report geolocation information (e.g., latitude and longitude coordinates) after power-up of the electronic device 700.

If the provisioning server has received geolocation information from the electronic device 700 or through another communication means, the server 122 completes (816) or commences and completes the electronic device's provisioning build and transmits (818) the provisioning data to the electronic device 700 via a wide area network 121 and where applicable, via an OTA data transfer, thereby ending (820) the logic flow. However, if the server 122 has not received the location of the electronic device 700 after a predetermined period of time (e.g., 24 hours or less), then the server 122 determines whether it has received an image of the electronic device 700 captured at the time of installation (e.g., as part of the electronic device's installation information), such as through operation of a mobile application on a mobile device 112 of the electronic device installer. If such an image was received, the server 112 checks (810) or analyzes the metadata of the image and determines (812) whether the metadata includes geotag information (geolocation information). If no geotag information is contained in the image metadata, the provisioning server delays (822) provisioning of the electronic device 700 until the electronic device's installation location is received, and the logic flow ends (820).

On the other hand, when the metadata of the electronic device image (or another image of the equipment 600 captured at the time of installation) includes geotag information, the server 122 resolves (814) the electronic device's geolocation from the geotag information, completes (816) the provisioning build for the electronic device 700, and transmits (818) the provisioning data to the electronic device 700 via the wide area network 121 and where applicable, via an OTA data transfer. Thus, when the electronic device 700 does not timely self-report its geolocation data after power-up, the server 122 may still be able to complete provisioning of the electronic device 700 in the system through use of geotag information in received image data captured at the time of installation of the electronic device 700.

A method and apparatus (electronic device) have been disclosed that facilitate the collection of installation information for equipment. Installation information is collected using image capture, where images of asset tags or other identifying indicia and optionally of the installation as a whole are captured. To make it easier for installers who may have limited dexterity when installing a monitoring device or other electronic device (e.g., due to wearing heavy gloves), a mobile application executing on a mobile device carried by the installer may initiate image collection automatically upon being shaken and then displaying a countdown timer to the mobile device user to allow the user to know when the mobile device camera will automatically capture an image of a specified object, such as an asset tag, label, or plate, for inclusion as part of the installation information.

Further, a method and apparatus (server) have been disclosed that permit generation of provisioning data for a newly installed electronic device when the location of the newly installed electronic device has not been self-reported by the electronic device or reported to the server separately. To prevent undesirable delays in provisioning the newly installed electronic device, image metadata of one or more images captured at or about the time of installation of the electronic device (e.g., images captured as part of operation of a mobile application executed at or about the time of the electronic device installation) may be analyzed to determine if the metadata includes geolocation information, such as geotag data, that can be used to resolve the geolocation of the newly installed electronic device and thereby permit the provisioning process to continue. Such a method and apparatus avoid provisioning delays inherent in the use of human operators to manually acquire and enter the electronic device's location information.

The claims appended hereto are meant to cover all modifications and changes within the scope and spirit of the present disclosure.

What is claimed is:

1. A method for automatically provisioning an electronic device installed at an installation location, the method comprising:

receiving, at a server located remotely from the installation location, installation information relating to installation of the electronic device, the installation information including at least one image captured at the installation location;

determining, by the server, whether geolocation information for the electronic device was received from the electronic device after the electronic device was installed at the installation location;

responsive to determining that geolocation information for the electronic device was not received from the electronic device after the electronic device was installed at the installation location, determining, by the server, whether the at least one image includes geolocation metadata;

when the at least one image includes geolocation metadata, determining, by the server, a geolocation of the electronic device based on the geolocation metadata;

responsive to determining the geolocation of the electronic device, generating, by the server, at least some provisioning data for the electronic device to produce generated provisioning data; and transmitting, by the server, at least the generated provisioning data to the electronic device.

2. The method of claim 1, wherein the at least one image includes an image of an asset tag for the electronic device.

3. The method of claim 1, wherein the electronic device is a monitoring device and wherein the at least one image includes an image of the electronic device as mounted to a piece of equipment being monitored.

4. The method of claim 1, further comprising:
responsive to determining that geolocation information for the electronic device was received from the electronic device after the electronic device was installed at the installation location, determining, by the server, the geolocation of the electronic device based on the received geolocation information.

5. The method of claim 1, wherein the electronic device is at least one of a monitoring device, a sensor device, a small cell access device, a wireless access point, an edge processor, and an Internet of Things device.

6. The method of claim 5, wherein the electronic device is a monitoring device for a distribution transformer.

7. The method of claim 5, wherein the electronic device is a monitoring and control device for a streetlight.

8. The method of claim 1, wherein the installation information was received from a mobile application running on a mobile device located at or near the installation location.

9. The method of claim 1, wherein the provisioning data includes configuration data for the electronic device.

10. A server for provisioning an electronic device installed at an installation location remote from a location of the server, the server comprising:
memory that stores at least processor-readable operating instructions; and
at least one processor that is operable in accordance with the processor-readable operating instructions to:
receive installation information relating to installation of the electronic device, the installation information including at least one image captured at the installation location;
determine whether geolocation information for the electronic device was received from the electronic device after the electronic device was installed at the installation location;
responsive to determining that geolocation information for the electronic device was not received from the electronic device after the electronic device was installed at the installation location, determine whether the at least one image includes geolocation metadata;
when the at least one image includes geolocation metadata, determine a geolocation of the electronic device based on the geolocation metadata;
responsive to determining the geolocation of the electronic device, generate at least some provisioning data for the electronic device to produce generated provisioning data; and
transmit at least the generated provisioning data to the electronic device.

11. The server of claim 10, wherein the at least one image includes an image of an asset tag for the electronic device.

12. The server of claim 10, wherein the electronic device is a monitoring device and wherein the at least one image includes an image of the electronic device as mounted to a piece of equipment being monitored.

13. The server of claim 10, wherein the at least one processor is further operable in accordance with the processor-readable operating instructions to:
determine the geolocation of the electronic device based on geolocation information received from the electronic device responsive to determining that the geolocation information was received from the electronic device after the electronic device was installed at the installation location.

14. The server of claim 10, wherein the electronic device is at least one of a monitoring device, a sensor device, a small cell access device, a wireless access point, an edge processor, and an Internet of Things device.

15. The server of claim 14, wherein the electronic device is a monitoring device for a distribution transformer.

16. The server of claim 14, wherein the electronic device is a monitoring and control device for a streetlight.

17. The server of claim 10, wherein the installation information was received by the at least one processor from a mobile application running on a mobile device located at or near the installation location.

18. The server of claim 10, wherein the provisioning data includes configuration data for the electronic device.

19. A method for automatically provisioning an electronic device installed at an installation location, the method comprising:
receiving, at a server located remotely from the installation location, installation information relating to installation of the electronic device, the installation information including at least one image captured at the installation location;
determining, by the server, whether geolocation information for the electronic device was received from the electronic device after the electronic device was installed at the installation location;
responsive to determining that geolocation information for the electronic device was received from the electronic device after the electronic device was installed at the installation location, determining, by the server, a geolocation of the electronic device based on the received geolocation information;
responsive to determining that geolocation information for the electronic device was not received from the electronic device after the electronic device was installed at the installation location, determining, by the server, whether the at least one image includes geolocation metadata;
when the at least one image includes geolocation metadata, determining, by the server, the geolocation of the electronic device based on the geolocation metadata;
responsive to determining the geolocation of the electronic device, generating, by the server, at least some provisioning data for the electronic device to produce generated provisioning data, wherein the generated provisioning data includes configuration data for the electronic device; and
transmitting, by the server, at least the generated provisioning data to the electronic device.

20. The method of claim 19, wherein the at least one image includes an image of the electronic device as mounted to a piece of equipment.

* * * * *